United States Patent Office.

SETH GRIFFITH, OF AURORA, ILLINOIS.

Letters Patent No. 67,750, dated August 13, 1867.

IMPROVED COMPOSITION FOR GRANULATING SORGHUM SIRUP.

*The Schedule referred to in these Letters Patent and making part of the same.*

---

Be it known that I, SETH GRIFFITH, of Aurora, in the county of Kane, and State of Illinois, have invented a new and improved Process for Granulating Sorghum Sirup; and I do hereby declare that the following is a full, clear, and exact description of the application and use of the same.

The nature of my invention consists in the application and use of beef's tallow, saleratus, and alum, combined with sorghum sirup.

To enable any one skilled in the art to use the above-named ingredients, I will proceed to give the proportions of each, which may be varied proportionately, as occasion may require.

I take a suitable vessel containing fifty gallons of sirup; boil it until nearly ready to take from the fire; sufficiently so for sugar. I then put in, beef's tallow, one pound; saleratus, one ounce; alum, one ounce. This constitutes my process for granulating the sirup, which will do it on all kinds of the same.

As other kinds of grease than beef tallow appear to answer the purpose as well, I do not propose, therefore, to limit myself to beef tallow alone, but contemplate the use of all kinds of tallow and grease, or oil.

Having thus fully described my invention, what I claim therein as new, and desire to secure by Letters Patent, is—

The application and use of the herein-described ingredients, combined with sorghum sirup, substantially in the manner and for the purpose as herein set forth.

SETH GRIFFITH.

Witnesses:
    A. T. BOON,
    JOSEPH STAFFORD.